United States Patent [19]

Ando et al.

[11] Patent Number: 4,956,944
[45] Date of Patent: Sep. 18, 1990

[54] POLISHING APPARATUS

[75] Inventors: Manabu Ando; Nobuo Nakamura; Yoshitane Tsuchiya, all of Yokohama; Hirotaka Fuse, Tsuchiura; Kazuo Watanabe; Koushi Shinoda, both of Ushiku, all of Japan

[73] Assignee: Canon Kabushiki Kaisha, Tokyo, Japan

[21] Appl. No.: 401,477

[22] Filed: Aug. 29, 1989

Related U.S. Application Data

[63] Continuation of Ser. No. 168,001, Mar. 14, 1988, abandoned.

[30] Foreign Application Priority Data

Mar. 19, 1987 [JP] Japan ................................. 62-62592
Mar. 19, 1987 [JP] Japan ................................. 62-34808

[51] Int. Cl.⁵ .............................................. B24B 49/00
[52] U.S. Cl. .................................... 51/165.71; 51/55; 51/124 L; 51/284 R
[58] Field of Search ............ 51/55, 565, 124 R, 124 L, 51/165.71, 165.75, 284 R

[56] References Cited

U.S. PATENT DOCUMENTS

| | | | |
|---|---|---|---|
| 2,977,724 | 4/1961 | Kennedy et al. | 51/124 L |
| 3,021,647 | 2/1962 | Maitenaz | 51/124 L X |
| 3,564,776 | 2/1971 | Aspden | 51/55 |
| 3,566,544 | 3/1971 | Aspden | 51/55 |
| 3,587,195 | 6/1971 | Aspden | 51/284 |
| 3,589,078 | 6/1971 | Bala et al. | 51/165 |
| 3,676,960 | 6/1972 | Aspden | 51/165 |
| 3,769,762 | 11/1973 | Mayo | 51/284 |
| 4,161,847 | 7/1979 | Whang | 51/55 X |
| 4,173,848 | 11/1979 | Ikeno | 51/55 |
| 4,493,168 | 1/1985 | Field | 51/124 L X |
| 4,584,799 | 4/1986 | Juvet | 51/124 L X |

FOREIGN PATENT DOCUMENTS 58-181561 10/1983 Japan .
59-1147 1/1984 Japan .
60-39510 6/1985 Japan .

Primary Examiner—James G. Smith
Attorney, Agent, or Firm—Fitzpatrick, Cella, Harper & Scinto

[57] ABSTRACT

A polishing apparatus for polishing a surface of a work piece requiring high surface precision such as an optical component or a metal mold by applying a tool, in which the tool is given a rocking motion of the surface of work to be polished while the work is given a rotary motion. Besides the rotary motion of the work, the rotation and rocking motion of the tool and the movement of the tool on the surface to be polished are detected and are controlled according to the working information for the surface to be polished.

6 Claims, 12 Drawing Sheets

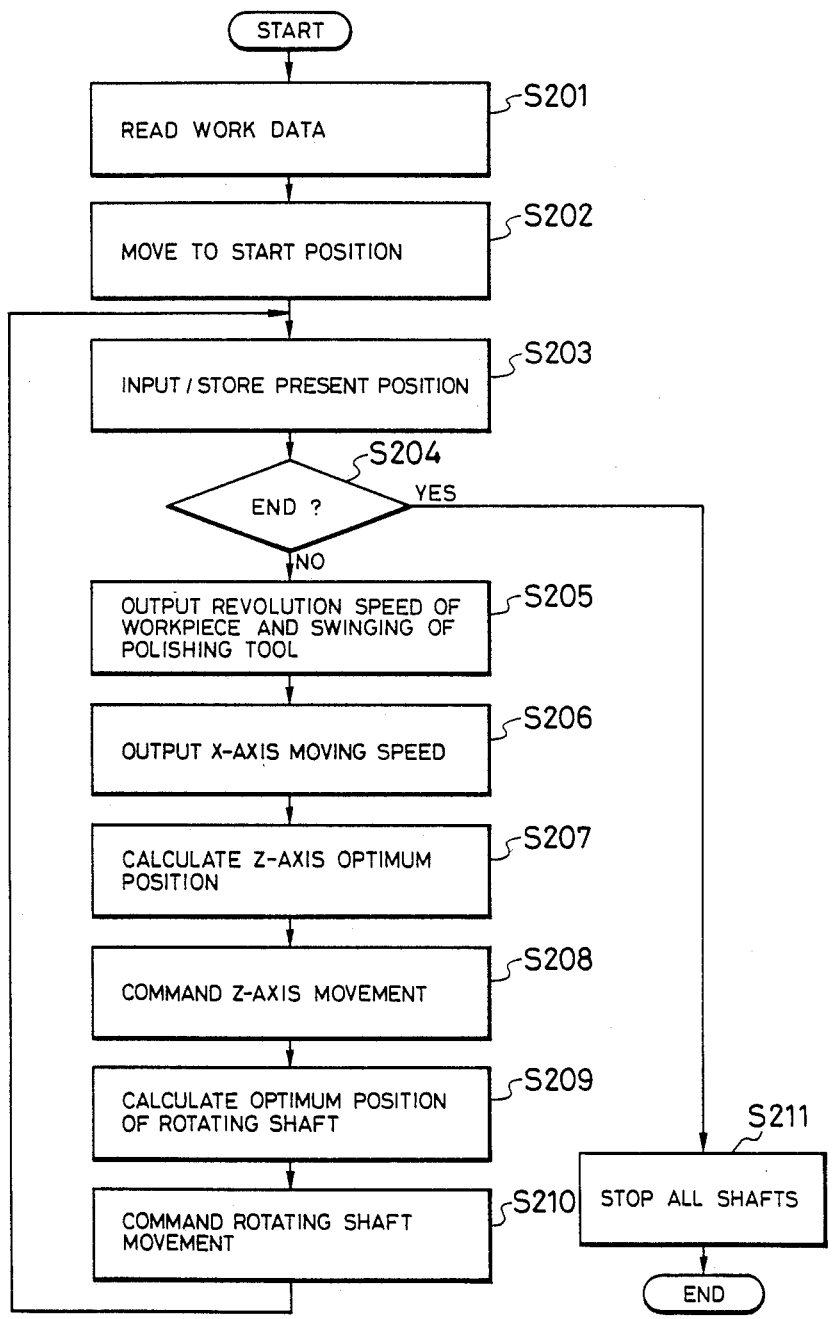

FIG. 10A

| X-AXIS POSITION | $\theta_{ij}$ ANGLE OF WORKING SHAFT AND ROTATING SPEED OF WORKING SHAFT $V_{wij}$ | | | | |
|---|---|---|---|---|---|
| $r_0 \sim r_1$ | $\theta_{00} \sim \theta_{01}$ $V_{w00}$ | $\theta_{01} \sim \theta_{02}$ $V_{w01}$ | $\theta_{02} \sim \theta_{03}$ $V_{w02}$ | --------- | $\theta_{0j} \sim \theta_{00}$ $V_{w0j}$ |
| $r_1 \sim r_2$ | $\theta_{10} \sim \theta_{11}$ $V_{w10}$ | $\theta_{11} \sim \theta_{12}$ $V_{w11}$ | $\theta_{12} \sim \theta_{13}$ $V_{w12}$ | --------- | $\theta_{1K} \sim \theta_{10}$ $V_{w1K}$ |
| ⋮ | ⋮ | ⋮ | ⋮ | ⋮ | ⋮ |
| $r_i \sim r_{i+1}$ | $\theta_{i0} \sim \theta_{i1}$ $V_{wi0}$ | $\theta_{i1} \sim \theta_{i2}$ $V_{wi1}$ | $\theta_{i2} \sim \theta_{i3}$ $V_{wi2}$ | --------- | $\theta_{i\ell} \sim \theta_{i0}$ $V_{wi\ell}$ |

FIG. 10B

| X-AXIS POSITION | $\theta_{ij}$ ANGLE OF WORKING SHAFT AND ROTATING SPEED OF POLISHING TOOL $V_{Tij}$ | | | | |
|---|---|---|---|---|---|
| $r_0 \sim r_1$ | $\theta_{00} \sim \theta_{01}$ $V_{T00}$ | $\theta_{01} \sim \theta_{02}$ $V_{T01}$ | $\theta_{02} \sim \theta_{03}$ $V_{T02}$ | --------- | $\theta_{0j} \sim \theta_{00}$ $V_{T0j}$ |
| $r_1 \sim r_2$ | $\theta_{10} \sim \theta_{11}$ $V_{T10}$ | $\theta_{11} \sim \theta_{12}$ $V_{T11}$ | $\theta_{12} \sim \theta_{13}$ $V_{T12}$ | --------- | $\theta_{1K} \sim \theta_{10}$ $V_{T1K}$ |
| ⋮ | ⋮ | ⋮ | ⋮ | ⋮ | ⋮ |
| $r_i \sim r_{i+1}$ | $\theta_{i0} \sim \theta_{i1}$ $V_{Ti0}$ | $\theta_{i1} \sim \theta_{i2}$ $V_{Ti1}$ | $\theta_{i2} \sim \theta_{i3}$ $V_{Ti2}$ | --------- | $\theta_{i\ell} \sim \theta_{i0}$ $V_{Ti\ell}$ |

FIG. 10C

| X-AXIS POSITION | $\theta_{ij}$ ANGLE OF WORKING SHAFT AND ROCKING SPEED $V_{yij}$ | | | | |
|---|---|---|---|---|---|
| $r_0 \sim r_1$ | $\theta_{00} \sim \theta_{01}$ $V_{y00}$ | $\theta_{01} \sim \theta_{02}$ $V_{y01}$ | $\theta_{02} \sim \theta_{03}$ $V_{y02}$ | --------- | $\theta_{0j} \sim \theta_{00}$ $V_{y0j}$ |
| $r_1 \sim r_2$ | $\theta_{10} \sim \theta_{11}$ $V_{y10}$ | $\theta_{11} \sim \theta_{12}$ $V_{y11}$ | $\theta_{12} \sim \theta_{13}$ $V_{y12}$ | --------- | $\theta_{1K} \sim \theta_{10}$ $V_{y1K}$ |
| ⋮ | ⋮ | ⋮ | ⋮ | ⋮ | ⋮ |
| $r_i \sim r_{i+1}$ | $\theta_{i0} \sim \theta_{i1}$ $V_{yi0}$ | $\theta_{i1} \sim \theta_{i2}$ $V_{yi1}$ | $\theta_{i2} \sim \theta_{i3}$ $V_{yi2}$ | --------- | $\theta_{i\ell} \sim \theta_{i0}$ $V_{yi\ell}$ |

FIG. 11
| X-AXIS POSITION | $r_{x0} \sim r_{x1}$ | $r_{x1} \sim r_{x2}$ | $r_{x2} \sim r_{x3}$ | - - - - - - | $r_{xi} \sim r_{xi-1}$ |
|---|---|---|---|---|---|
| X-AXIS SPEED | $V_{x1}$ | $V_{x2}$ | $V_{x3}$ | - - - - - - | $V_{xi+1}$ |
FIG. 12
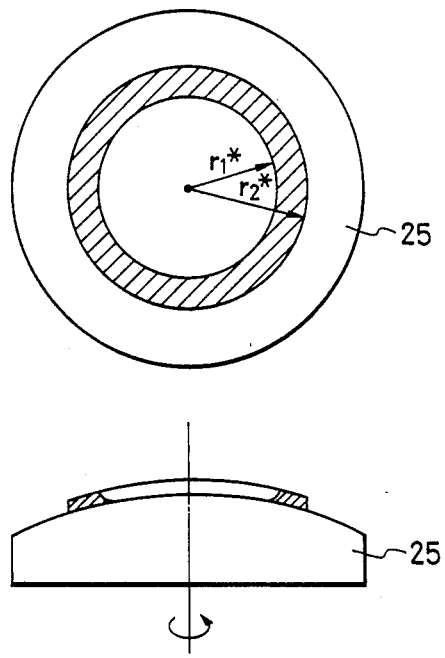
FIG. 13
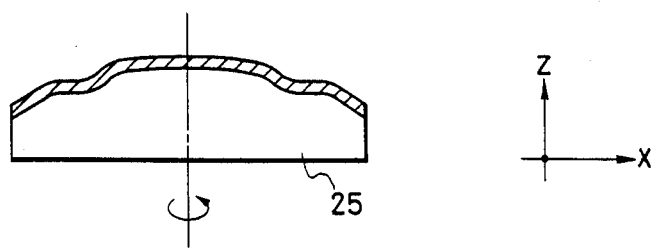

POLISHING APPARATUS

This application is a continuation of application Ser. No. 168,001 filed Mar. 14, 1988, now abandoned.

BACKGROUND OF THE INVENTION

1. Field of the Invention

The present invention relates to the technology of polishing with a high surface precision or grinding a curved surface such as a spherical or aspherical surface.

2. Related Background Art (1) For the purpose of polishing an object with a curved surface, for example an optical component such as a lens, Japanese Laid-open Patent No. 1147/1984 discloses an apparatus shown in FIGS. 1A and 1B. As shown in these drawings, a table 7 placed on a bed 6 is provided with an inclining unit 9 for rotating a shaft 8. Said table 7 and said inclining unit 9 are driven by instruction signals from a numerical control unit 10, whereby the table 7 is moved in the direction of the X-axis while the shaft 8 is rotated by the inclining unit 9. At an end of the shaft 8 opposite to the inclining unit 9 there is provided a work rotating unit 13 composed of a motor A11 and a rotating table 12, in which the rotation of the motor A11 is transmitted to said table 12 to rotate a work 4 mounted on said table 12. A column 14 is connected to the bed 6, and a polishing head 3 is slidably mounted on a guide rail 15 supported by said column 14. The polishing head 3 is rendered movable in the direction of Z-axis by an electric-hydraulic servo mechanism composed of a controller 16, a hydraulic control unit 17 and a hydraulic cylinder 18, thereby applying a tool 19 such as a grinding stone or an elastic member to the work 4 under a predetermined polishing pressure. The polishing head 3 is provided therein with a motor B20, thereby rotating the tool 19.

In the following there will be an explanation of the polishing apparatus explained above. FIG. 1B is a schematic view showing the function of said apparatus.

Input data is given to the controller 16 from a data setter 22 mounted on an operation console 21. Said input data is composed of a function F(x) defining a curved surface 5 to be polished, polishing ranges $x_1$, $x_2$ of said curved surface 5, a relative speed between the tool 19 and the work 4, a number n of cycles to be explained later, an ascending or descending distance h of the tool 19, an amount $\Delta x$ of movement. In FIG. 1B, in the initial setting of the work 4 and the polishing head 3, the angle $\theta$ and the tool position ( are both at zero. When the polishing operation is started in this state, the controller 16 executes a calculation according to the equation (1) with a radial position $x_1$ on the curved surface 5, and the result of calculation is transferred to the numerical control unit 10 whereby the inclining unit 9 shown in FIG. 1A inclines the work rotating unit 13 by an angle $\theta$ and the table 7 is moved to the tool position 1. Also the controller 16 executes a calculation according to the equation (2) to determine the work rotating speed $N_w$ and activates the motor A11 to rotate the work 4 while rotating the motor B20 in synchronization, thereby matching rotating speed of the tool 19 with that of the work 4. In such state the controller 16 activates the hydraulic control unit 17 to lower the polishing head 3. Whereby the tool 19 is brought into contact with the curved surface 5 to achieve polishing operation, under a constant polishing pressure of the tool 19 on the surface 5. After the work 4 rotates by a predetermined number n of cycles at the radial position $x_1$ on the curved surface 5, the polishing head 3 is elevated by a height h in the Z-direction in response to an instruction signal from the controller 16. Then the amount of movement $\Delta x$ of the input data is added to $x_1$ whereby the controller 16 renews the radial position on the surface 5 to $(x+\Delta x)$ and repeats the operation in a similar manner as in the radial position $x_1$. In this manner the controller 16 moves the radial position x on the curved surface 5 in the polishing range from $x_1$ to $x_2$ whereby the processed surface 5 is efficiently and automatically polished by the tool 19 in uniform manner.

(2) Optical components, for example photographing lenses for use in a camera, have spherical and aspherical surfaces, and require high precision for surface smoothness. Also the requirement for the precision of products with respect to the design value of the spherical or aspherical surface is strict. In case of an aspherical lens, manufacturing precision can be achieved if the degree of asphericity is small, but, if it becomes larger, precision is very difficult to maintain. When a particular glass material is finished to a preliminary surface coarseness and particular tool and particular polishing conditions (abrasive, polishing pressure, polishing speed etc.) are selected, it is already known that the amount to be abraded in such system is proportional to the polishing time, and this relationship is utilized in the computer controlled polishing for controlling the work and the tool.

Among such apparatus for controlling the function of work and tool with a computer, there are already known:

(2-1) apparatus in which an aspherical work piece is rotated, as disclosed in the U.S. Pat. Nos. 3,566,544, 3,564,776 and 3,769,762;

(2-2) apparatus in which a work piece is rotated while a tool is moved in the radial direction of the work, as disclosed in the U.S. Pat. Nos. 3,566,544 and 3,564,776; and (2-3) apparatus in which a work piece is fixed while a tool performs a scanning motion in the X- and Y-directions, as disclosed in the U.S. Pat. Nos. 3,587,195, 3,589,078 and 3,676,960.

SUMMARY OF THE INVENTION

An object of the present invention is to provide a polishing apparatus suitable for polishing a large-sized mirror or a mirror with a high surface precision.

Another object of the present invention is to provide an apparatus for executing a grinding or polishing operation by rotating a work piece such as a mirror and causing a rocking motion of a tool maintained in contact with the processed surface of said work piece.

Still another object of the present invention is to provide a polishing apparatus capable of moving a tool on a surface of a work piece, having means for storing the working information for the work piece and for detecting the moving state of the tool, and capable of controlling the amount of work according to the detection signal and the working information.

Still another object of the present invention is to provide an apparatus suitable for polishing a work piece having a toric or troidal surface, effecting a rotating or pivoting motion of a work piece and rotating and rocking motions of a tool, then detecting the state of said motions of the work piece and the tool and effecting a feedback control on said motions of the work piece and the tool based on the detection signal and the working information of the work piece.

BRIEF DESCRIPTION OF THE DRAWINGS

FIGS. 2 to 13 illustrate a first embodiment of the present invention, wherein:

FIG. 2 is an external perspective view of said first embodiment;

FIG. 3 is a closs-sectional view along a line M—M in FIG. 2;

FIG. 4 is a block diagram showing an example of a control unit;

FIGS. 5 to 7 are charts showing the working principle of an embodiment of the present invention;

FIG. 8 is a flow chart showing an example of the control sequence of an embodiment of the present invention;

FIG. 9 is a chart showing an example of the working pattern;

FIGS. 10A, 10B, 10C and 11 are data tables showing example of working data;

FIG. 12 is a chart showing another example of the working pattern;

FIG. 13 is a chart showing still another example of the working pattern;

FIGS. 14A to 17 illustrate a second embodiment of the present invention, wherein:

FIG. 14A is an external perspective view of said second embodiment;

FIG. 17 is a plan view showing the relative movement of a tool to a work piece to be polished.

DESCRIPTION OF THE PREFERRED EMBODIMENTS

In the following there will be explained an embodiment of the present invention, while making reference to FIG. 2 and the ensuing drawings.

Figure 2:
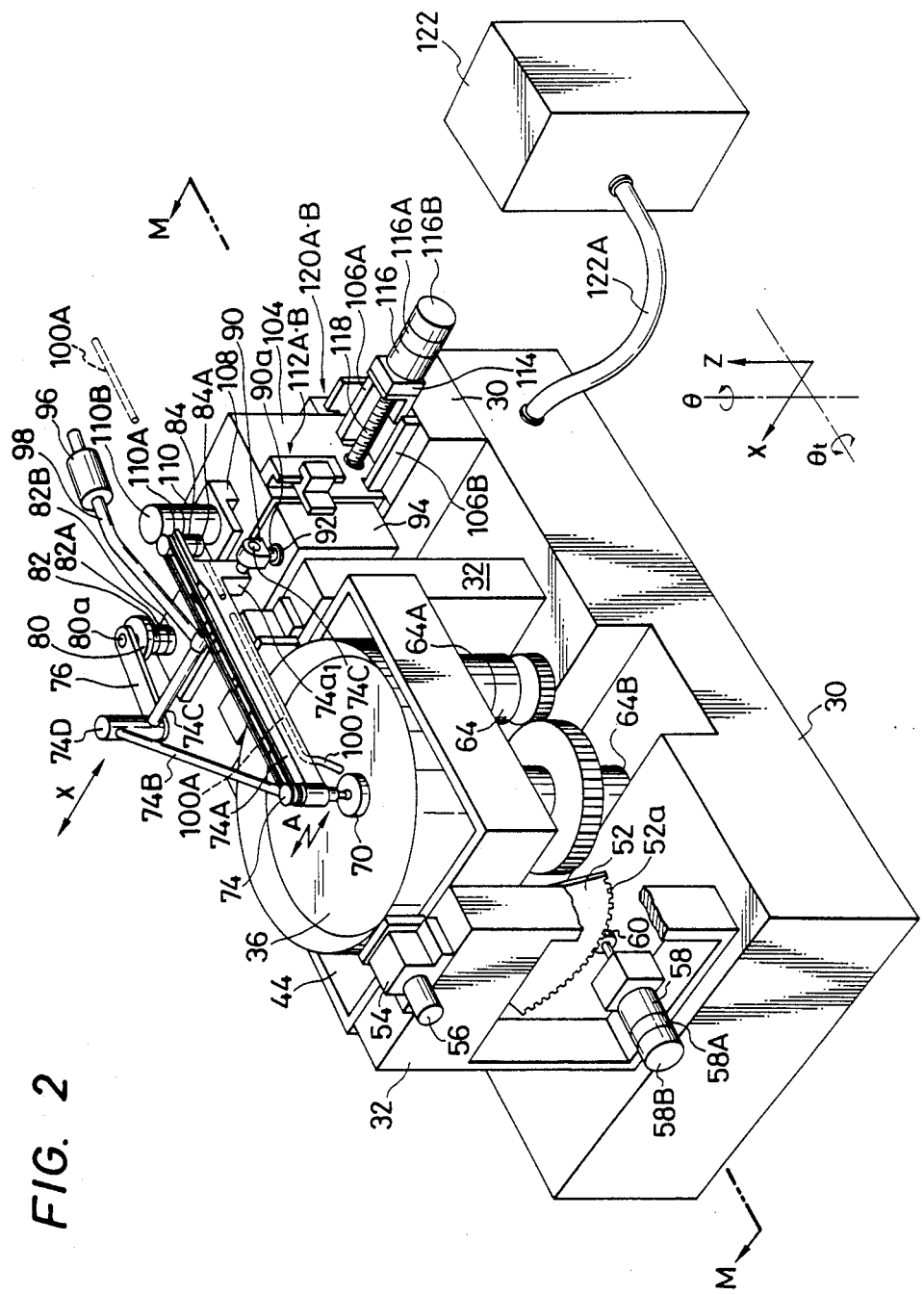
Figure 3:
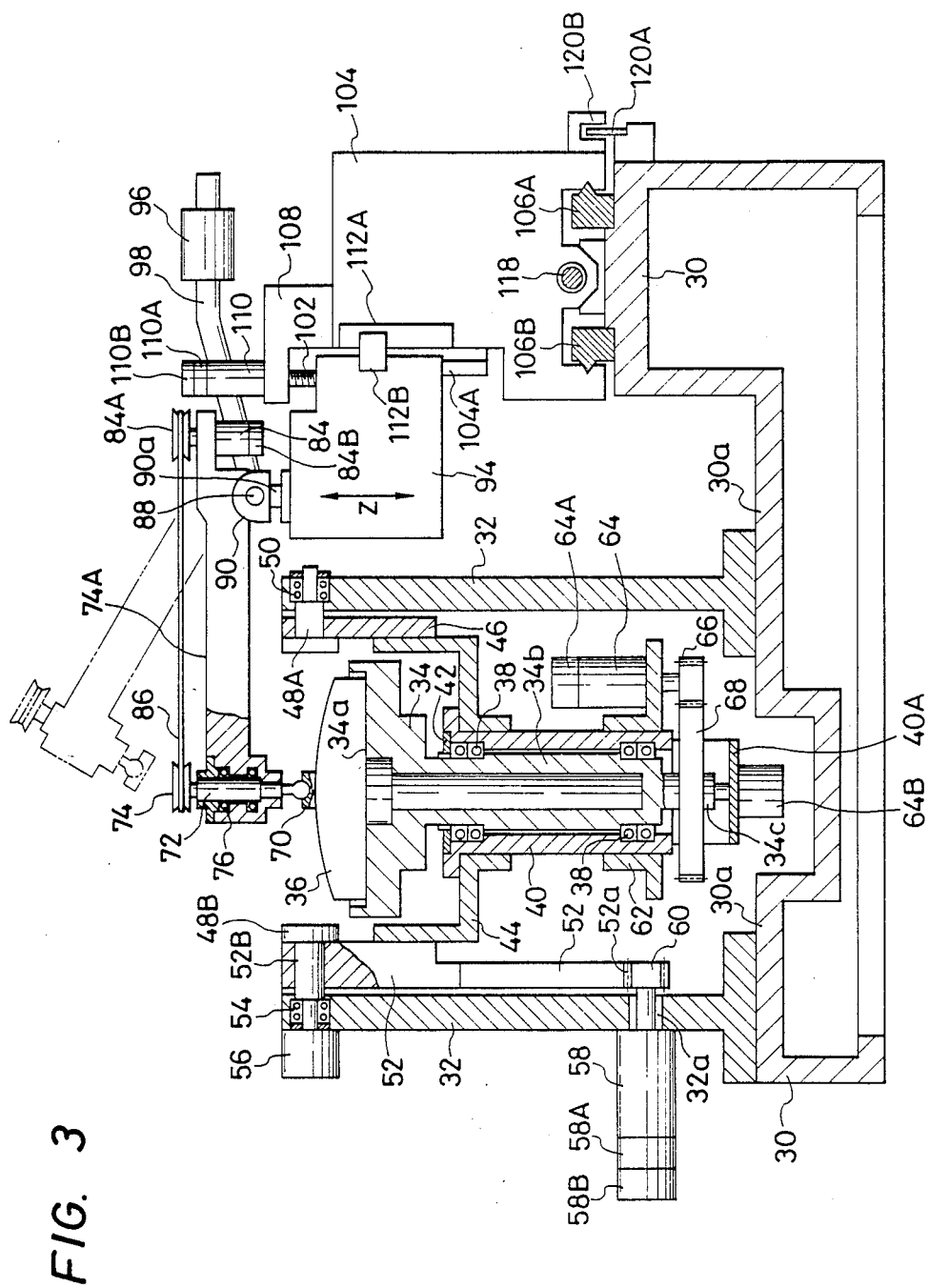
Figure 4:
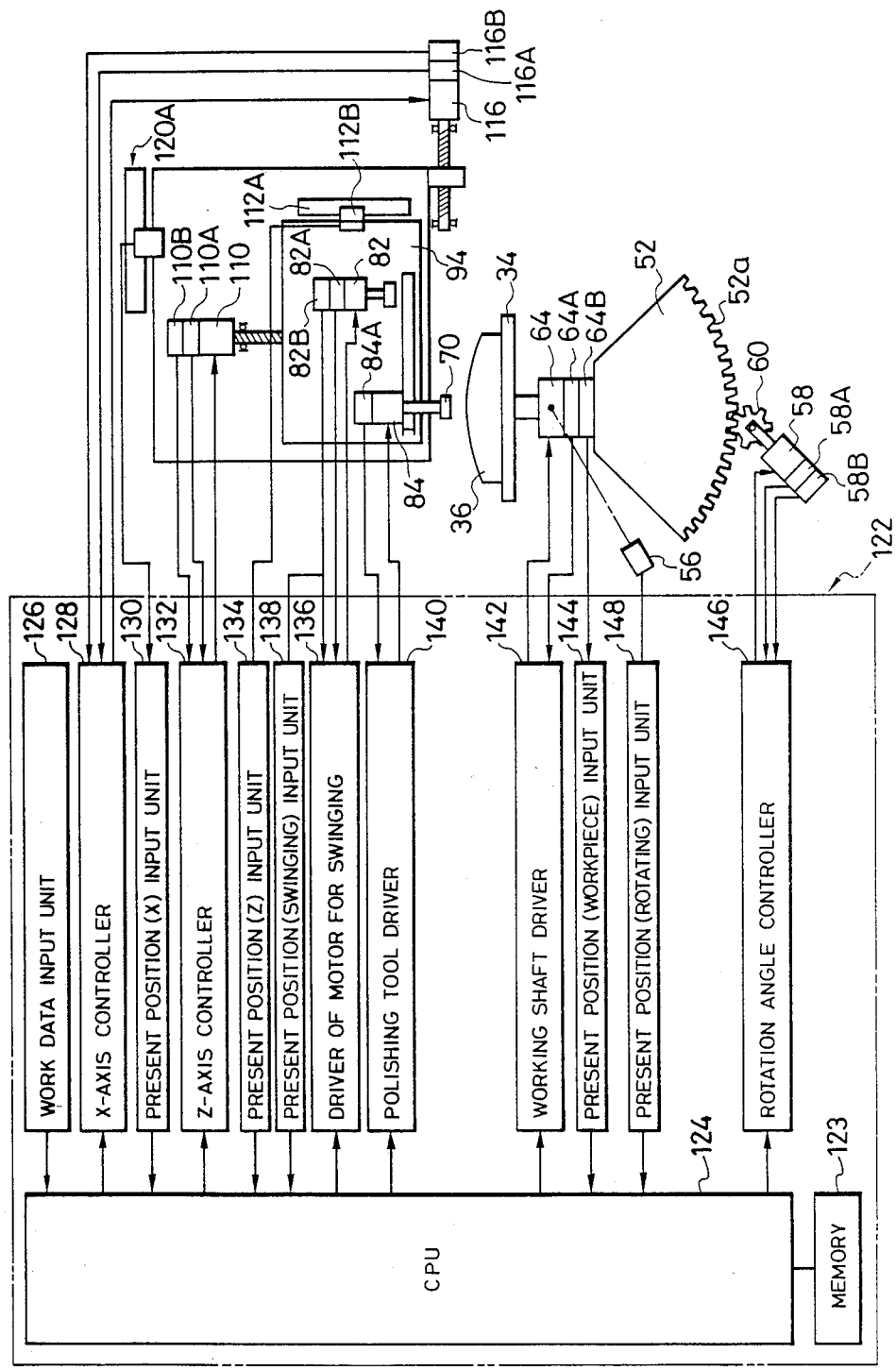

FIGS. 2 and 3 illustrate a polishing apparatus adapted for polishing an object with a three-dimensionally curves surface, such as an aspherical lens, a toric lens or a Schmidt plate, and FIG. 4 is a block diagram of a control circuit therefor.

In these drawings there are shown;

a main base 30;

columns 32, 32 vertically fixed on upper faces 30a, 30a of said base;

a support member 34 for supporting an object to be polished (work piece) 36 for example with screws on a top face 34a, and contained in a housing 40 by means of bearings 38, 38, . . . mounted on a shaft portion 34b;

a leak seal 42 of said housing 40;

a liquid tray 44 for containing polishing liquid, fixed, at a lower aperture, to said housing 40 and provided, on the bottom face, with an unrepresented drain for liquid recovery;

a support arm 46 fixed, at an end, to a lateral face of said tray 44 and articulated, at the other end, to the column 32 by a shaft 48A;

a bearing 50 said shaft 48A;

a sector-shaped pivoting arm 52 having gear teeth 52a on the arc-shaped rim of the sector, pivotably supported by a shaft 48B at the pointed end of the sector and laterally fixed to said tray 44;

a bearing 54 for said shaft 48B;

an encoder 56 for detecting the pivoting position of said pivoting arm 52, mounted on the shaft 48b;

a pivoting motor 58 mounted on the column 32 for rotating the pivoting arm 52, with a shaft passing through an aperture 32a of the column 32 and provided, at an end thereof, with a gear 60 meshing with the teeth 52a of said pivoting arm;

a tachogenerator 58A and an encoder 58B for measuring the rotating speed of the pivoting motor 58;

a motor base 62 fixed on said housing 40 for mounting a work rotating motor 64 of which the shaft is provided with a gear 66 meshing with a gear 68 mounted on a shaft portion 34C at the lower end of said work support member 34b; and an encoder 64B for the shaft 34C of the work support member 34, mounted on a bracket 40A mounted in turn on the housing 40.

Members 72–98 constitute rotating means and rocking means for a tool 70.

A shaft 72 for rotating the tool 70 is connected at the lower end to the tool 70 through a universal joint, provided at the upper end with a belt pulley 74, and supported by a rocking arm 74A by a bearing 76. The rocking means is composed of a first rocking arm 74A, second and third rocking arms 74B, 74C, a crank lever 76, a crank shaft 78 (not shown), a crank cam 80 and a rocking motor 82. Said rocking arms are connected in a triangular form, wherein ends of the arms 74B, 74C are connected to the arm 74A, and the other ends are fixed to a shaft 74D. An end of the crank lever 76 is rotatably supported by the shaft 74D through an unrepresented pin, while the other end is rotatably supported on the cam 80 by a pin 80a. Said cam 80 is linked to the shaft of a tool rocking motor 82. There is also provided a tachogenerator 82A and an encoder 82B for detecting the rotating speed of said motor 82.

Said rocking arm 74A is connected, at an end, to the tool rotating motor 84, of which the shaft has a pulley 84A linked with a belt 86 with the afore-mentioned pulley 74 A tachogenerator 84A and an encoder 84B is provided for detecting the rotating speed of the motor 84.

The rocking arm 74A is provided, at an end thereof, with a support portion 74a in which a shaft 88 is fitted A frame member 90 for supporting the rocking arm 74A supports said shaft 88, and is mounted, by a lower shaft portion 90a and a frame 92, to a second slide member 94 Thus the rocking arm 74A can perform a rocking motion about the axis of the shaft 90a, and can rotate also about the axis of the frame shaft 74C.

A balance weight 96 is mounted on a balance arm 98 of which an end is mounted on the rocking arm 74C, whereby the pressure of the tool 70 onto the work piece 36 can be regulated by the adjustment of the position of said weight 96 on the balance arm 98. A nozzle 100 supplies polishing liquid, containing abrasive material for polishing the work piece 36. The present embodiment performs polishing operation through a rocking motion of the tool 70, and the polishing liquid is preferably supplied in linkage with said rocking motion In the present embodiment, a supply tube 100A connected to the nozzle 100 is fixed to said rocking arm 74A to achieve linked rocking motion of the tool 70 and the nozzle 100. The right-hand end of the supply tube 100A is connected to an unrepresented liquid supply unit, which is suitably composed for example of a supply pump, a regulating valve, a filter etc. In the polishing apparatus of the present embodiment, as will be apparent from the following explanation of the function, it is necessary to move the tool 70 for example in the radial direction along the processed surface of the work piece 36. For this reason there is provided means for moving the tool 70 in the X-direction (radial direction) and in Z-direction (direction of thickness) in case the work piece 36 is for example a convex or concave lens.

In the following said moving means will be explained.

The support frame 90 for the rocking arm 74A constituting the aforementioned rocking means is supported by a first slide member 94 of a substantially rectangular shape, provided with a screw hole which engages with a screw shaft 102 for advancing the slide member.

The second slide member 104 of a substantially rectangular shape is provided with a guiding recess thereunder as shown in FIG. 3, which engages with guide rails 106A, 106B mounted on said base 30. A block 108 fixed on the upper face of the second slide member 104 supports a Z-axis tool moving motor 110, of which the shaft is connected to the aforementioned screw shaft 102 There is provided a tachogenerator 110A and an encoder 110B for detecting the rotating speed of said motor 110 A guide member 140A protruding from the lateral face of the second slide member 104 engages with an unrepresented guide groove formed on the first slide member 94 for guiding the same.

First position detecting means 112A, 112B for detecting the moving position of the first slide frame 94 can be composed of a magnetic scale or a linear encoder.

An L-shaped angle 114, mounted on the base 30 between the aforementioned guide rails 106A, 106B, supports a motor 116 for moving the second slide member 104, a tachogenerator 116A and an encoder 116B. A screw shaft 118, for advancing the second slide member 104, is connected to the shaft of said motor 116 and engages with a screw hole provided in the second slide member 104 Second position detecting means 120A, 120B is provided for detecting the movement of the second slide member.

FIG. 4 is a block diagram schematically showing the apparatus shown in FIGS. 2 and 3, with control means for controlling the above-explained work rotating means, tool rotating means, tool rocking means, work pivoting means and tool X-Y-moving means A control unit 122, incorporating the above-mentioned control means, communicates with said various means through a cable 122A. There is provided a central processing unit (CPU) 124, and memory means 123 composed of a ROM having an area for storing control programs for the means for controlling the above-mentioned rotating, rocking and pivoting means, and a RAM having an area for storing input data from a work data input unit 126, data of position detection etc.

X-axis movement control means 128 controls the movement of said second slide member 104 in the X-direction by driving the motor 116 based on a signal from a present position input unit 130 receiving signals from the tachogenerator 116A and the encoder 116B and from the X-axis position detecting means 120A, and on information from said work data input unit 126.

Z-axis control means 132 for the first slide member 94 receives signals from the tachogenerator 110A and encoder 110B. Also the information from the present position input unit 134 receiving a signal from the position detecting means 112B and the information from said work data input unit 126 are supplied to said Z-axis control means 132 through the CPU 124. In response to a signal from the CPU, said Z-axis control means 132 releases a signal for controlling the Z-axis moving motor 110

A rocking motor driver 136 receives signals from the tachogenerator 82A and encoder 82B, and a drive signal from the CPU 124. The signal from the encoder 82B is also supplied to a present position input unit 138, and the CPU 124 processes said signal and the information from the work data input unit 126 and sends a process signal to the rocking motor driver, thereby driving the rocking motor 82.

A polishing tool driver 140 receives a signal from the tachogenerator 84A and the information from the work data input unit, after processing in the CPU 124, and thus controls the tool rotating motor 84.

A driver 142 for controlling the rotating speed of a motor 64 for rotating the support member 34 supporting the work piece 36 receives a signal from the tachogenerator 64A and information from the CPU 124. The CPU 124 receives the information from the encoder 64B through an input unit 144, calculates an optimum revolution based on said work data and releases the result to the driver 142, which accordingly controls the motor 64.

A pivot angle controller 146, for controlling a motor 58 for pivoting the pivoting arm 52, receives signals from the tachogenerator 58A and encoder 58B. The CPU 124 calculates an optimum pivoting from a signal from a present pivoting input unit 148 and the information of work data input and sends the result to said controller 146, which accordingly controls the pivoting motor 58.

Figure 6:
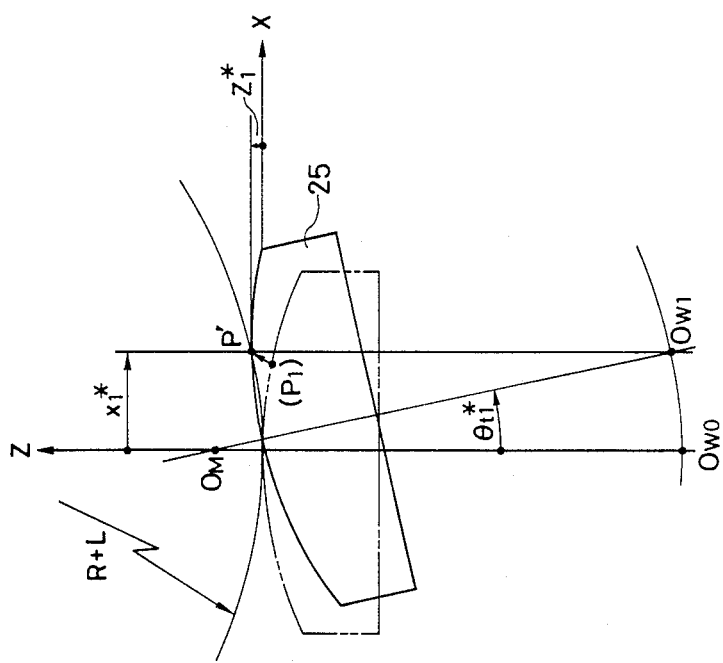
Figure 5:
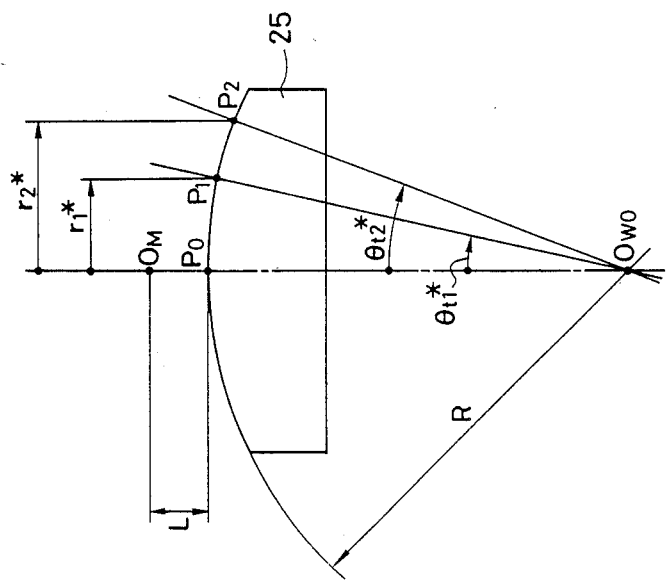

In the polishing of a work piece 36 with a curved surface of a radius R of curvature, said work piece 36 is pivoted by a predetermined angle, while the polishing tool 70 is moved in the X- and Z-directions. In this operation, in order to stabilize the amount to be abraded, the rotary axis of the polishing tool 70 is made to coincide with the normal line to the work piece 36 and with the direction of gravity, at a contact point $P_1$ distant by a radius $r_1*$ from the central axis of the work piece 36, and this principle will be explained in the following. In FIGS. 5 and 6, $O_M$ is the center of the pivoting axis 13; $O_{wo}$ is the center of curvature of the work piece 36 when the pivoting angle $\theta_t*$ is 0°; $O_{wl}$ is a moved position of the center of curvature of the work piece 36 at a pivoting angle $\theta_{tl}*$; $P'(X_1*, Z_1*)$ is a moved position of the point $P_1$ on X-Z coordinate system at a pivoting angle $\theta_1$; and L is the distance between the top position $P_o$ of the work piece 36 and $O_M$.

In general it is difficult to make the center $O_M$ of the pivoting shaft 48B to coincide with the center $O_{wo}$ of curvature of the work piece 36, so that both are separated by a distance R+L. Therefore, in order to make the center of the rotary shaft of the polishing tool 70 coincide with the normal line to the work piece 36 and with the direction of gravity at a contact point $P_1$ distant by a radius $r_1*$ from the central axis of the work piece 36, said work piece 36 is pivoted by an angle $\theta_{t1}*$ about the center $O_M$ of the pivoting shaft 48B to bring the contact point $P_1$ to a position $P'(X_1*, Z_1*)$ and the polishing tool 70 is likewise moved to said position P'.

In this state there stand following relations:

$$X_1^* = (R + L) \sin\theta_{t1}^* \qquad (1)$$

$$Z_1^* = (R + L) - \sqrt{(R + L)^2 - X_1^{*2}} \qquad (2)$$

Similarly, for a contact point $P_2$ distanced by a radius $r_2'$ from the central axis of the work piece 36, said work piece 35 is pivoted by an angle $\theta_{t2}^*$ about the center $O_M$ of the pivoting shaft 48B to bring the point $P_2$ to a position $P''(X_2^*, Z_2^*)$, and the polishing tool 70 is simultaneously moved to said position $P''$. In this manner both the vertical position Z of the polishing tool 70 and the pivoting angle $\theta_t$ can be represented by functions of X, so that the center of rotary shaft of the polishing tool 70 can always be made to coincide with the normal line to the work piece 36 and with the direction of gravity, for a work piece 36 with an arbitrary radius R of curvature, through the control satisfying the above-explained equations (1) to (3).

In the following there will be explained a basic function in case of polishing the entire work piece 36 or a part thereof. The work piece 36 fixed to the work supporting shaft 34 is rotated by the work driving motor 64 in response to an instruction from the control unit 122 receiving the work data, and under control of position and speed according to a position detection signal from the encoder 64B of said supporting shaft 34 and a speed detection signal from the tachogenerator 64A. Similarly the polishing tool 70, supported by the rocking arm 74A, presses the polished portion of the work piece 36 by an unbalance caused by the balance weight 96, and is rotated under speed control according to a speed detection signal from the tachogenerator 84A. The rocking arm 74A is driven by the motor 82 through the rocking crank mechanism 76 according to an instruction from the control unit 122, under control of position and speed in response to the signal from the encoder 82B and tachogenerator 82A, and transmits a rocking motion about a rocking shaft $90a$, in a direction A (FIG. 2), to the polishing tool 70. The amplitude of rocking motion of the polishing tool 70 can be adjusted by a variable mechanism, for example for varying the connecting point in the crank mechanism 76. Such adjustment is effective for example in a gradient polishing. Also the start point of the rocking motion can be made constant through the angle detection with the encoder 82B.

While the motion starting position and speed of the work supporting shaft 34, polishing tool 70 and rocking arm 74A are controlled by the control unit 122, the pivoting angle $\theta_t$ of the work piece 36 and the position (X,Z) of the polishing tool 70 are processed by the control unit 122 according to the aforementioned equations (1)-(3) to effect position control.

More specifically, the pivoting angle of the work piece 36 is controlled by the revolution control of the motor 58, based on the present position input signal from the encoder 56, the position detection signal from the encoder 58B and the speed detection signal from the tachogenerator 58A. On the other hand, the horizontal direction (X-axis) control of the polishing tool 70 is achieved by the rotation control of the motor 116, based on the present position input signal from the position detecting means 120A, 120B, the position detection signal from the encoder 116B and the speed detection signal from the tachogenerator 116A. Also the control in the vertical (Z-axis) direction is achieved by the rotation control of the motor 110, based on the present position input signal from the position detecting means 112A, 112B, the position detection signal from the encoder 110B and the speed detection signal from the tachogenerator 110A.

The above-mentioned operations are conducted by the control unit 122 in response to the continuously entered work data, in such a manner that the center of rotary shaft of the polishing tool 70 always coincides with the normal line to the work piece 36 and with the direction of gravity at any position on the work piece 36.

Now reference is made to a flow chart shown in FIG. 8, for explaining an example of the control sequence of the present embodiment. When the control is started, a step S201 reads the work data such as the radius of curvature, working position, amount to be abraded etc. externally entered in advance into the work data input unit 126, and stores said data in the memory 124. Then a step S202 regulates the pivoting angle of the work piece 36 and the X and Z positions of the polishing tool 70 to a work start position, according to a work program and work data stored in advance in the memory 124. A step S203 receives the X-position from the position detecting means 120A, 120B, the Z-position from the position detecting means 112A, 112B, the position of rocking arm from the encoder 82B, the rotational position of the work supporting shaft 34 from the encoder 64B and the pivoting angle of the work piece 36 from the encoder 56 through the present position input units, and stores said data ($X_1$, $Z_1$, $S_1$, $\theta_1$, $\theta_{t1}$) in the memory 124. Then a step S204 discriminates whether the present position is a work end point, and, if so, the sequence proceeds to a step S211 to terminate the working operation. On the other hand, if the work end point is not yet reached, the sequence proceeds to a step S205.

The step S205 determines the optimum values of the rotating speed of the work piece 36 and the rotating and rocking speeds of the polishing tool 70 at the present position, based on the work data, and sends driving instructions to the work support driver 142, polishing tool driver 140 and rocking motor driver 136. Then a step S206 calculates the moving speed in the X-direction, based on the work data and the present position, and sends a moving instruction to the X-axis control unit 128. A step S207 calculates, from the present position $X_1$ in the X-direction entered in the step S203, the optimum Z-position according to the shape of the work piece 36, for example $Z_0=(R+L)-\sqrt{(R+L)^2-X_1^2}$ in the aforementioned example. A step S208 then sends a moving instruction to above-calculated position $Z_0$, to the Z-axis control unit 132. Subsequently a step S209 calculates, from the present position $X_1$ in the X-direction entered in the step S203, the optimum pivoting angle of the work piece 36 matching the shape thereof, for example $\theta_{to}=\arcsin(X_1/(R+L))$ in the aforementioned example.

A step S210 sends, to the pivoting angle controller 146, a moving instruction to the position $\theta_{to}$ determined in the above-mentioned calculation. The foregoing steps S203 to S210 are repeated until the end of working operation is identified in the step S204.

In the above-explained control sequence, the moving instruction in the Z-direction and the moving instruction for the pivoting shaft are given serially, but this will not be difficult since the processing speed of the CPU 124 is faster than the moving speed of the mechanism.

In the following there will be explained basic polishing patterns realized by the above-explained basic functions.

Figure 9:
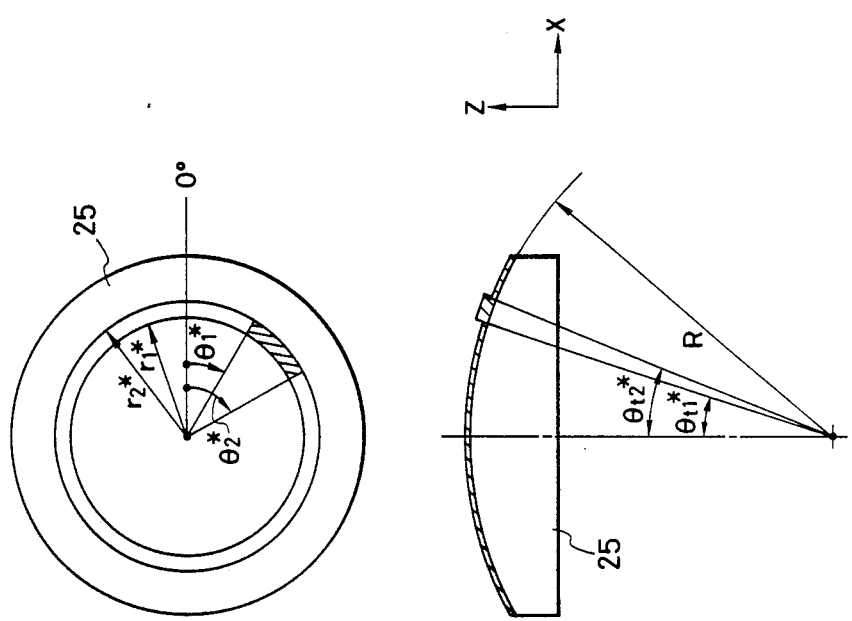

FIG. 9 shows a case of correction polishing, in which a work piece 36 with a radius R of curvature is polished with a modified amount of abrasion within a radial range of $r_1^*$-$r_2^*$ and an angular range $\theta_1$-$\theta_2$. Such polishing can be achieved, while the angular position of the work supporting shaft 34 by the encoder 64B, by varying the rotating speed of the work piece 36 in the angular range of $\theta_1^*$-$\theta_2^*$ thereby varying the staying period of the polishing tool 70 in said range, or varying the rotating or rocking speed of the polishing tool 70 while maintaining the rotating speed of the work piece 36 at a constant value, or combining the two methods. The control unit 122 receives, from outside, the parameters of the work piece 36 composed of the distance L from the top $P_o$ of the work piece 36 to the center $O_M$ of the pivoting shaft; radius R of curvature; above-mentioned work range data ($r_1^*$, $r_2^*$, $\theta_1^*$ and $\theta_2^*$) and prearranged work data as shown in data tables in FIGS. 10A, 10B, 10C and 11. In FIGS. 10A, 10B and 10C, the rotating speed ($V_{wij}$) of the working shaft 34 is defined for an angular range $\theta_{ij}$-$\theta_{i0}$, obtained by dividing the radial working range (for example $r_1^*$-$r_2^*$) of the work piece 36 into annular areas $r_0$-$r_i$ and further dividing each annular area into angular areas $\theta_{i0}$-$\theta_{ij}$. Also the rotating speed $V_{Tij}$ of the polishing tool 70 and the rocking $V_{yij}$ thereof are defined in similar manner. In FIG. 11, $V_{xi}$ indicates the moving speed along the X-direction within a range $r_i$-$r_{i+1}$ in the X-direction.

Figure 7:
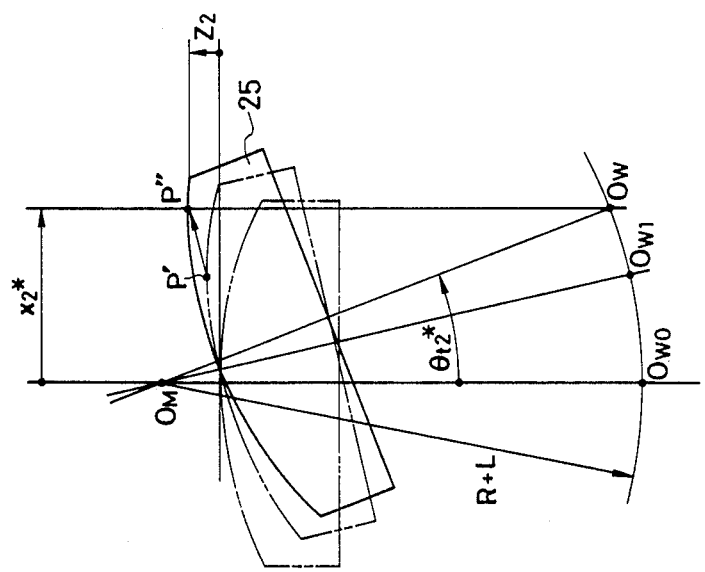

This data is processed in succession by the control unit 122 according to the aforementioned flow chart, and, in response, simultaneously with the pivoting of the work piece 36, the polishing tool 70 from P'($X_1^*$, $Y_1^*$) to P''($X_2^*$, $Y_2^*$) along a trajectory as shown in FIGS. 6 and 7.

In the course of this operation, based on the data shown in FIGS. 10A, 10B, 10C and 11, the rotating speed of the work supporting shaft, rotating and rocking speeds of the polishing tool in a divided area (area shown in FIG. 9) of the work piece 36 are varied from those in other areas according to the necessity, thereby modifying the amount of abrasion in said area from that in other areas. In the data table shown in FIGS. 10A, 10B and 10C the number of division of the areas and the divided areas are common for the rotating speed of the work supporting shaft and the rotating and rocking speeds of the polishing tool, but they may be suitably varied in the number of division or in the form of divided areas for a particular speed, and such variation will be effective for achieving gradient polishing.

FIG. 12 shows a case of polishing off, from a similar work piece 36, an entire annular area of a radial range of $r_1^*$-$r_2^*$. In this case, uniform polishing can be applied to a concentric annular area formed by rotating, around the axis, an area $r_i$-$r_{i+1}$ obtained by dividing the radial range $r_1^*$-$r_2^*$ of the work piece 36 into areas $r_0$-$r_{i+1}$. Therefore the rotating speed $V_{wij}$ of the working shaft and the rotating speed $V_{Tij}$ and the rocking speed $V_{yij}$ of the polishing tool are maintained constant while the polishing tool 70 remains on said concentric annular area, and the abraded amount is controlled by varying the X-axis speed $V_{xi+1}$.

Consequently the required input work data are $V_{wo}$-$V_{wl}$, $V_{To}$-$V_{Ti}$ and $V_{yo}$-$V_{Ti}$ only corresponding to $r_o$-$r_{i+1}$ in FIGS. 10A, 10B and 10C, and the data shown in FIG. 11.

The driving motors are controlled by the control unit 122 according to this data, thereby achieving the polishing off of the area specified as shown in FIG. 12.

FIG. 13 shows a case of polishing off the upper surface of a work piece 36 in continuous manner from the center to the periphery thereof, wherein said surface has different values of curvature. Also in this case the work data for the work piece, representing the changes in the curvature in the course of working, are entered, thereby driving the motors with speeds suitable for such different values of curvature.

Although the foregoing description has been limited to the polishing of a convex surface, the present embodiment is also applicable to the polishing of a concave surface by the entry of suitable work data. Also it is naturally applicable not only to polishing operation but also to scraping operation.

Figure 14A:
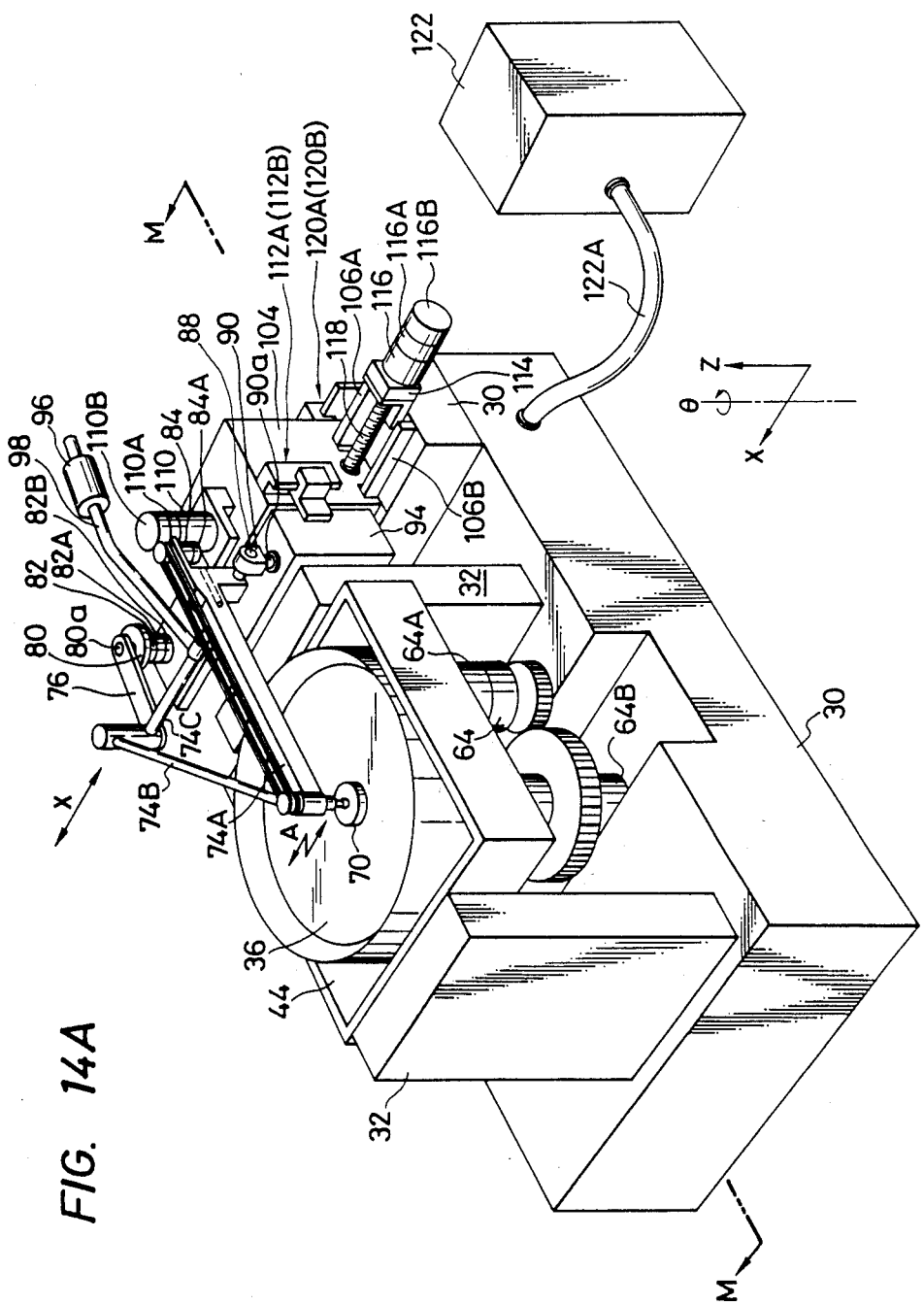
Figure 14B:
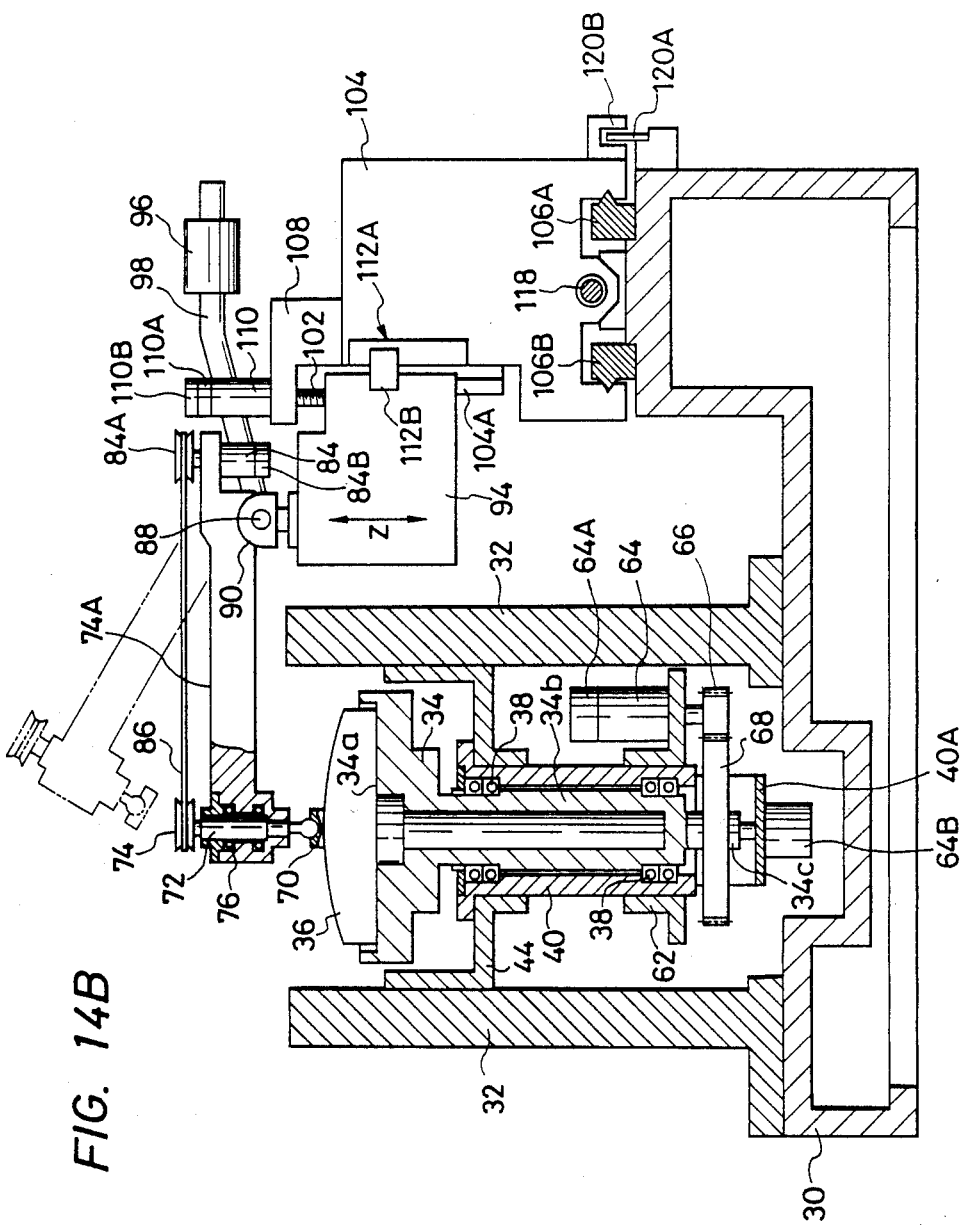
FIG. 14B is a cross-sectional view along a line M-M in FIG. 14A.

FIGS. 14A and 14B illustrate a second embodiment of the present invention, in which the pivoting means shown in FIGS. 2, 3 and 4 is eliminated.

The illustrated apparatus is suitable for the spherical polishing of an axially symmetrical lens, such as a spherical concave lens or a spherical convex lens. The apparatus shown in FIGS. 14A and 14B will not be explained in detail, as it is equivalent to that shown in FIGS. 2, 3 and 4 except that the pivoting mechanism and the pivoting control system are removed.

An axially symmetrical work piece is generally polished under rotation of said work piece about the axis, but the polishing of a large work piece may result in the formation of alternating small projections and recesses in the form of concentric circles around the center of rotation, a phenomenon hereinafter called ripple. The apparatus shown in FIGS. 14A and 14B is suitable for removing such ripple.

Said apparatus is featured by a fact that a polishing tool, formed as a ring, performs a rocking motion in a predetermined direction on the work piece and simultaneously performs a scanning motion in another direction, and a fact that the component, in the rotating direction of the work piece, of the relative speed of the work piece and the polishing tool is so controlled as not to exceed a predetermined value.

The conditions of the tool, and the moving conditions thereof for eliminating minute ripples were investigated as follows.

The test piece employed in this investigation was a quartz glass lens with an external diameter of 170 mm and a radius of curvature of 490 mm, and ripples of a pitch of 6-7 mm and a height difference of roughness 0.1 μm were formed in advance on the spherical surface. The employed tools had an external diameter of 20 mm. A tool A has a contact face, contacting entirely with the test piece, having a curvature the same as that of the test piece (curvature of the contacting face being same also in tools B and C). The tool B had an annular contact face with an external diameter of 20 mm and an internal diameter of 10 mm, while the tool C had an annular contact face with an external diameter of 20 mm and an internal diameter of 15 mm. The contact faces were made of pitch, and the investigation was made on the polishing apparatus shown in FIGS. 14A and 14B.

Investigation on moving conditions of tool

The investigation was made in an area of 60-80 mm from the center of the test piece. The speeds shown in Tab. 1 are values averaged at a distance of 70 mm from the center of the test piece. The investigation 1 corresponds to a conventional technology; the investigation 2 shows a case in which the rotation of the test piece, rotation of tool and rocking of tool, constituting the principal polishing motion, are selected approximately equal; and the investigation 3 shows a case in which the proportion of the rotation of the test piece is selected less than 10%. The tool B was employed in these investigations. The scanning motion was made with a speed of 1 mm/min in the area from 60 to 80 mm from the center of the work piece, commonly in the investigations 1 to 3.

In the conditions of investigation 1, though a large amount was abraded, the ripples remained and could not be eliminated.

In the conditions of investigation 2, the elimination of ripples proceeds but requires a very long time since the amount of abrasion is low.

In the conditions of investigation 3, the ripples could be eliminated.

Figures 1A, 1B:
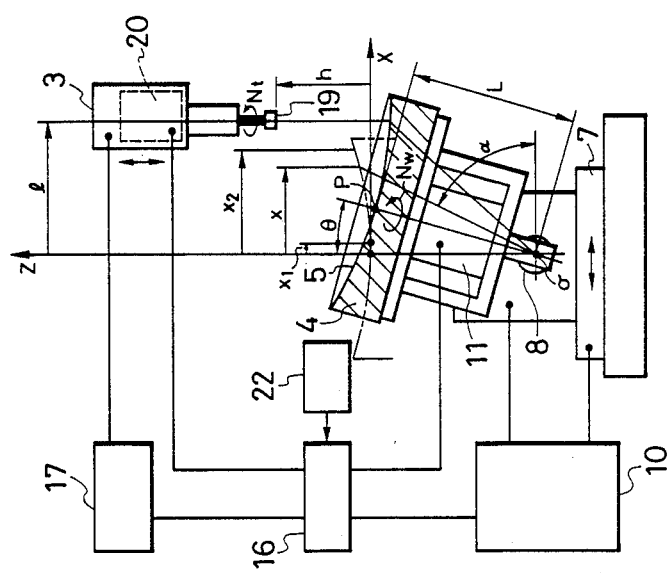
FIGS. 1A and 1B are schematic views of a prior polishing technology.

From these results there can be obtained following conclusions. The proportion of the rotation of the work piece in the relative speed should be as low as possible. Among other components, the scanning motion of the tool does not represent a high proportion since it is only required to effect the elimination of ripples over a large area of the work piece in continuous manner. The rocking motion of the tool, usually generated by a crank mechanism as shown in FIG. 1, tends to result in a vibration resulting from said crank mechanism, and cannot be significantly increased in number per unit time, in consideration of the limitation in weight of the rocking portion and the load on the crank mechanism. Also the stroke of the rocking motion cannot be increased significantly, due to the dimension of and the load of the crank mechanism. Consequently the rocking motion of the tool cannot represent a very high proportion in the relative speed, when the absolute value of the relative speed increases to a certain level. On the other hand, the rotating motion of the tool has a large freedom and can represent a large proportion in the composition of relative speed. In fact it can represent 87% in the relatively high relative speed in the investigation 3.

Investigation on the form of tool

The difference in the ripple eliminating ability of the tools A, B and C was investigated under the conditions of investigation 3. The load per unit area of the contacting face was selected equal. As the result, the tools B and C showed good ripple eliminating ability but the tool A showed a low ability. Also between the tools B and C, the tool C was superior. The difference between the tool A and the tool B or C is attributable to the difference in stability of motion of the tool on the work piece. A tool with poor stability comes into contact with the concave portion of the ripples in the course of polishing operation, particularly in the rocking motion, so that the intention of selectively eliminating the convex portions of the ripples cannot be achieved.

From these results it is concluded that the elimination of ripples requires two conditions; namely a ring shape of the tool and a condition of the investigation 3, in which the relative speed in the perpendicular direction to the ripples is selected as high as possible and that in the tangential direction of the ripples is selected as low as possible. Also the external diameter of the contacting face of the tool is preferably at least twice of the pitch of the ripples.

TABLE 1

| | Factor of motion | Investigation 1 | Investigation 2 | Investigation 3 |
|---|---|---|---|---|
| Relative speed composition (%) | Rotation of work piece | 87% | 31% | 6% |
| | Rotation of tool | 8 | 33 | 87 |
| | Rocking of tool | 5 | 35 | 7 |
| | Scanning motion of tool | 0 | 1 | 0 |
| Relative speed comparision | | 7.1 | 1.0 | 5.1 |
| Abrasion of work piece | | high | low | high |
| Ripple elimination | | little | possible but a long time needed | possible |

Figure 15A:
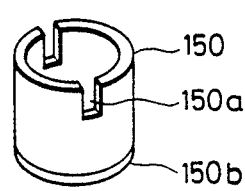
FIG. 15A is a perspective view of a polishing tool.
Figure 15B:
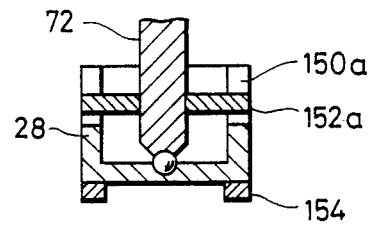
FIG. 15B is a cross-sectional view of the polishing tool in the mounted state.

The polishing tool is composed, as shown in FIG. 15A, of a cylindrical main body 150 having two recesses 150a for engaging with driving pins 152 to be inserted in directions perpendicular to the axis of the tool rotating shaft 72, and a ring-shaped polishing tool 154 fixed at the lower end. In the present embodiment, said polishing tool 154 is made of pitch, but it can also be made of foamed polyurethane.

Figure 16A:
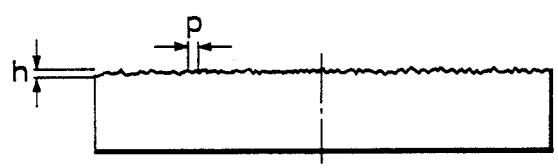
FIGS. 16A and 16B are cross-sectional views of the shape of a work piece before and after correction.
Figure 16B:
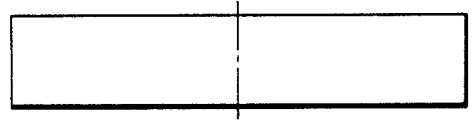

FIGS. 16A and 16B show the cross-sectional shape of the work piece 36, respectively before and after the correction with the polishing apparatus of the present invention. The work piece 36 before correction has ripples of a pitch p and a depth h.

Figure 17:
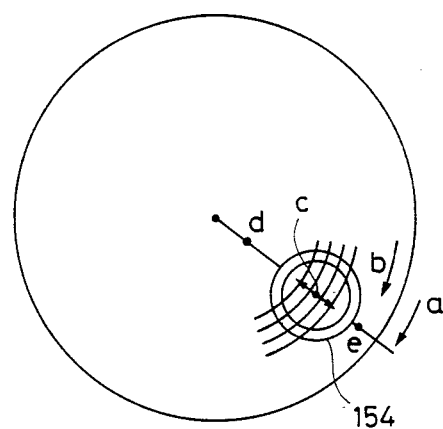

FIG. 17 shows the direction of relative movement of the polishing tool 154 relative to the work piece, when the work piece and the polishing tool are respectively rotated at a rpm and b rpm. The polishing tool is given a rocking motion of a predetermined stroke in a direction C, and a scanning motion from d to e. In the following is an example of the polishing conditions, following the conditions of the afore-mentioned investigation. The work piece was a quartz glass convex lens with an external diameter of 170 mm and a radius of curvature of 490 mm. The polishing tool was made of a pitch in a ring form with an external diameter of 20 mm and an internal diameter of 17.5 mm. The rotating speed of the work piece was selected at $a = 2$ rpm; the rotation of the polishing tool was $b = 200$ rpm; the rocking motion thereof was conducted at 100 cycles/min., with a stroke $c = 10$ mm; the scanning motion was conducted with a speed of 1 mm/min., in a range from $d = 40$ mm to $e = 70$ mm; and the polishing liquid contains celium oxide in 6 wt. %. The ripples of a pitch $p = 6 - 7$ mm and a height $h = 0.1$ μm were reduced to a height of $h = 0.06$ μm by two polishing operations under the above-explained conditions, and were further reduced to a practically acceptable height of 0.03 μm by three additional polishing operations or by five polishing operations in total.

Tab. 2 compares the result with that of a conventional process.

TABLE 2

| Item | Conventional technology | Present invention |
|---|---|---|
| Correction intended | Correction of large waviness errors | Correction of ripples |
| Tool size | Equal to or smaller than the pitch of waves to be corrected | At least twice of the pitch of ripples to be corrected |
| Rotation speed of work piece rpm | 40 | 2 |
| Rotation speed of polishing tool rpm | 25 | 200 |

TABLE 2-continued

| Item | Conventional technology | Present invention |
|---|---|---|
| Rocking speed cycles/min | 100 | 100 |
| Rocking stroke mm | 10 | 10 |
| Scanning stroke | none | 1 mm/min |

The ring-formed polishing tool may be provided with slits at a predetermined pitch.

As explained in the foregoing, the present invention provides a polishing process in which a polishing tool, having a ring-shaped contact face, is given a rocking motion in a predetermined direction on the work piece and is simultaneously given a scanning motion in another direction, and a component of the relative speed between said polishing tool and said work piece is so controlled as not to exceed a predetermined value, and a polishing apparatus provided with a control unit capable of giving a rocking motion and a scanning motion to the polishing tool according to the above-mentioned process and controlling the scanning range of said polishing tool by position detecting means, thereby enabling ripples on the surface of an optical element such as a lens in a highly efficient manner.

What is claimed is:

1. A polishing apparatus for polishing a work piece having a curved surface comprising:
   holding means for holding a tool on the curved surface of the work piece to be polished;
   first moving means for moving the tool to a polishing position in a radial direction on the curved surface;
   pivoting means for pivoting the work piece, said pivoting means providing a pivot axis positioned on a line connecting a center of curvature of the curved surface and an uppermost portion of the curved surface, and pivoting the work piece around said pivot axis by a pivot angle corresponding to a distance between said uppermost portion and said polishing position;
   a control unit for outputting information of an amount of movement of the tool with respect to the pivot angle of the work piece;
   second moving means for moving the tool in an axial direction of the work piece in accordance with said output information so that an axial direction of the tool coincides with a direction normal to the work piece at said polishing position; and
   force adjusting means for adjusting a pressing force of the tool on the work piece with said force adjusting means having a balance member held by said second moving means for adjusting the pressing force applied to the work piece.

2. A polishing apparatus according to claim 1, further comprising a nozzle for supplying liquid containing a working material to the surface of the work piece to be polished.

3. An apparatus according to claim 2, wherein said nozzle is mounted on said first moving means.

4. A polishing apparatus for polishing a work piece having a curved surface comprising:
   means for polishing the curved surface of the work piece;
   rotating means for rocking said polishing means on the curved surface of the work piece;
   first moving means for holding the tool on the curved surface to be polished and moving the tool in a radial direction of the work piece;
   second moving means for moving the tol in an axial direction of the work piece;
   pivoting means for pivoting the work piece;
   driving means for rotating the tool;
   memorizing means for memorizing polishing information of the work piece, said polishing information including working range information based upon a plurality of polishing positions $r_1^*$, $r_2^*$ in a radial direction of the work piece and angles $\theta_1^*$, $\theta_2^*$ taken with respect to an axis of the work piece, and controlling information for controlling said driving means of the tool in accordance with pivot angles $\theta t_1^*$, $\theta t_2^*$ corresponding to said polishing position, an amount of movement z of the tool corresponding to said polishing position in a direction normal to the axis of the work piece, a polishing amount at said polishing positions and said working range; and
   controlling means for controlling the operation of each said means, said controlling means maintaining a constant rotational speed of said work piece in a working area defined by $r_1^*$, $r_2^*$, $\theta_1^*$ and $\theta_2^*$, and changing a relative speed between the work piece and said polishing means in the working area by changing the rotational speed or the rocking speed of said polishing means.

5. A polishing apparatus making a pivoting motion on a work piece having a curved surface, and moving a tool on the curved surface of the work piece in a radial direction and in an axial direction for polishing the work piece, comprising:
   holding means for holding the tool on the curved surface of the work piece to be polished;
   first moving means for moving the tool in accordance with $$X_1* = (R+L) \sin \theta_{t1}*,$$

Wherein $X_1*$ is an amount of movement of the tool in the radial direction, R is a curvature radius of the work piece, L is a distance between a top of the work piece and a center of the pivoting motion, said L is a positive value when the center of the pivoting motion is in a space above the top of the work piece, and is a negative value when the center of the pivoting motion is in a space below the top of the work piece, and $\theta_{t1}*$ is a pivoting angle;
   second moving means for moving the tool in accordance with $$Z_1* = (R+L) - \sqrt{(R+L)^2 - (X_1*)^2}.$$

wherein $Z_1*$ is an amount of movement of the tool in the axial direction; and
   pivoting means for pivoting the work piece in accordance with $$\theta_{t1}* = \arcsin(r_1*/R),$$

wherein
   said polishing apparatus is capable of making a rotational center axis of the tool coincide with a normal line of the work piece having any curvature radius R.

6. A polishing apparatus for polishing a work piece having a curved surface comprising:
- a tool for polishing the curved surface of the work piece;
- rotating means for rotating the work piece around an axis thereof;
- rocking means for rocking said polishing tool on the curved surface of the work piece;
- first moving means for holding said tool on the curved surface to be polished and moving said tool in a radial direction of the work piece;
- second moving means for moving said tool in an axial direction of the work piece;
- pivoting means for pivoting the work piece;
- driving means for rotating said tool;
- memorizing means for memorizing polishing information of the work piece, said polishing information including position information comprising position data divided into a plurality of concentric annular areas in a range from a radius $\gamma o$ to a radius $\gamma i+1$ on the work piece, and speed information comprising speed data $Vx1, Vx2 \ldots Vxi+1$ in which each of the speeds corresponds to each of the concentric annular areas ($\gamma i\text{-}1\text{-}\gamma i$), with said first moving means moving said tool at the designated speed; and
- controlling means for controlling the operation of said tool, said rotating means, said rocking means, said first and second moving means, said pivoting means, said driving means, and said memorizing means, said controlling means controlling said first moving means to move said tool at a speed $Vxi$ based upon the speed data when said tool is moved to the concentric annular areas ($\gamma i\text{-}1\text{-}\gamma i$).

* * * * *

UNITED STATES PATENT AND TRADEMARK OFFICE
CERTIFICATE OF CORRECTION

PATENT NO. : 4,956,944            Page 1 of 3

DATED : September 18, 1990

INVENTOR(S) : Manabu Ando, et al.

It is certified that error appears in the above-identified patent and that said Letters Patent is hereby corrected as shown below: ON TITLE PAGE:

[30]    Foreign Application Priority Data:

"Mar. 19, 1987 [JP] Japan.........62-34808" should read
--Mar. 19, 1987 [JP] Japan.........62-64808--.

COLUMN 1:

Line 50, "position (" should read --position $\ell$ --.

COLUMN 3:

Line 11, "closs-sectional" should read
--cross-sectional--.

Line 49, "curves" should read --curved--.

UNITED STATES PATENT AND TRADEMARK OFFICE
CERTIFICATE OF CORRECTION

PATENT NO. : 4,956,944

DATED : September 18, 1990

INVENTOR(S) : Manabu Ando, et al.

It is certified that error appears in the above-identified patent and that said Letters Patent is hereby corrected as shown below:

COLUMN 4:

Line 46, "pulley 74 A" should read --pulley 74. A--.

Line 50, "support portion 74a" should read --$74a_1$--, and "fitted" should read --fitted.--.

Line 53, "member 94" should read --member 94.--.

Line 66, "motion In" should read --motion. In--.

COLUMN 5:

Line 26, "shaft 102" should read --shaft 102.--.

Line 29, "motor 110 A" should read --motor 110. A--, and "member 140A" should read --member 104. A--.

Line 43, "member 104 Second" should read --member 104. Second--.

Line 50, "means" should read --means.--.

COLUMN 6:

Line 8, "motor 110" should read --motor 110.--.

UNITED STATES PATENT AND TRADEMARK OFFICE
CERTIFICATE OF CORRECTION

PATENT NO. : 4,956,944
DATED : September 18, 1990
INVENTOR(S) : Manabu Ando, et al.

It is certified that error appears in the above-identified patent and that said Letters Patent is hereby corrected as shown below:

<u>COLUMN 7</u>:

Line 8, "piece 35" should read --piece 36--.

<u>COLUMN 13</u>:

Line 65, "piece;" should read
        --piece;
            rotating means for rotating the work piece
            around an axis thereof;--.

Line 67, "rotating means" should read --rocking means--.

<u>COLUMN 14</u>:

Line 4, "tol" should read --tool--.

Signed and Sealed this

Twenty-eighth Day of April, 1992

Attest:

HARRY F. MANBECK, JR.

*Attesting Officer*          *Commissioner of Patents and Trademarks*